UNITED STATES PATENT OFFICE.

WILHELM DIETERLE, OF FEUERBACH, GERMANY, ASSIGNOR TO THE FIRM OF J. HAUFF, OF SAME PLACE.

PROCESS OF PRODUCING ORTHOTOLUENE SULFONIC ACID.

SPECIFICATION forming part of Letters Patent No. 602,682, dated April 19, 1898.

Application filed May 7, 1897. Serial No. 635,557. (No specimens.)

*To all whom it may concern:*

Be it known that I, WILHELM DIETERLE, a citizen of the German Empire, residing at Feuerbach, near Stuttgart, in the Kingdom of Würtemberg and Empire of Germany, have invented certain new and useful Improvements in Processes of Producing Orthotoluene Sulfonic Acid and Orthobenzene Sulfonic Acid, of which the following is a specification.

In the manufacture of pure orthobenzoic sulfinid or anhydro-orthosulfamin benzoic acid the starting substances employed are orthotoluene sulfonic acid and orthobenzene sulfonic acid. These starting substances cannot be produced directly from the crude material in a chemically-pure form. In the processes employed of producing the same, isomeric compounds are obtained, the separation of which cannot be fully accomplished, or at least only at considerable expense.

I have found that orthothiocresol, obtained by the processes described by Leuckart in the *Journal für Practische Chemie*, 1890, pages 41 and 186, and by Lustig, *Gazetta Chim.*, XXI, page 213, forms an extremely valuable starting substance for the production of chemically-pure orthotoluene sulfonic acid and orthobenzene sulfonic acid. By treating orthothiocresol with a suitable oxidizing substance, such as potassium permanganate, the sulfo-hydrate group is converted into the sulfonic-acid group and thereby orthotoluene sulfonic acid obtained. By subjecting the mass still more to the influence of the oxidizing substances the methyl group is oxidized into the carboxyl group, so that orthobenzene sulfonic acid is obtained. These changes by oxidation take place quantitatively, and can therefore be carried out with previously-computed quantities of the substances, such as, for instance—

(*a.*) For making toluene sulfonic acid are used thiocresol, twelve kilos; sodium lye, (forty per cent. NaOH,) thirteen kilos; potassium permanganate, ($KMnO_4$,) thirty-two kilos; water, about one thousand liters. The solution is heated until the red color disappears and then filtered and evaporated to dryness. The thus-obtained sodium salt of orthotoluene sulfonic acid can be used directly for the production of the other intermediary substances in the manufacture of orthobenzoic sulfinid.

(*b.*) For making orthobenzene sulfonic acid the following proportions are used: thiocresol, twelve kilos; sodium lye, (forty per cent. NaOH,) thirty-two kilos; potassium permanganate, ($KMaO_4$,) sixty-four kilos; water, about two thousand liters.

The oxidizing substance employed produces, first, the oxidation of the thiocresol into orthotoluene sulfonic acid and then the oxidation of the latter into orthobenzene sulfonic acid. These substances are then employed in the manufacture of orthobenzoic sulfinid or orthosulfamin benzoic acid in the well-known manner.

It is obvious that this synthetical process can also be applied to those substitution products of orthotoluidin whose substituents are not changed by the usually-employed oxidizing substances, so that the corresponding substitution products of the orthotoluene sulfonic and orthobenzene sulfonic acids are obtained. In a similar manner orthobenzene sulfonic acid can be obtained from orthotoluidin, which is combined with chlorin in the side ring, only with the difference that less of the oxidizing substance is required.

Having thus described my invention, I claim as new and desire to secure by Letters Patent—

1. The process herein described of producing orthobenzene sulfonic acid, which consists in subjecting orthothiocresol continuously to the action of oxidizing substances, substantially as set forth.

2. In the art or process of producing orthobenzene sulfonic acid, the process of producing orthotoluene sulfonic acid by subjecting orthothiocresol to the action of oxidizing substances, substantially as set forth.

3. The process herein described of producing orthobenzene sulfonic acid, which consists in subjecting orthothiocresol to the continuous action of oxidizing substances in sufficient quantitative proportions so as to produce first the oxidation of the orthothiocresol into orthotoluene sulfonic acid, and then the oxidation of the latter into orthobenzene sulfonic acid, substantially as set forth.

In testimony that I claim the foregoing as my invention I have signed my name in presence of two subscribing witnesses.

WILHELM DIETERLE.

Witnesses:
ERNST DIETRICH,
ALFRED BOGISCH.